US008578825B2

(12) United States Patent
Oberheim

(10) Patent No.: US 8,578,825 B2
(45) Date of Patent: Nov. 12, 2013

(54) TABLE SAW WITH MECHANICAL FUSE

(75) Inventor: Stephen C. Oberheim, Des Plaines, IL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/538,422

(22) Filed: Jun. 29, 2012

(65) Prior Publication Data

US 2012/0325065 A1 Dec. 27, 2012

Related U.S. Application Data

(62) Division of application No. 12/548,201, filed on Aug. 26, 2009, now Pat. No. 8,210,076.

(51) Int. Cl.

| | |
|---|---|
| ***B23D 45/06*** | (2006.01) |
| ***B26D 7/22*** | (2006.01) |
| ***B27G 19/02*** | (2006.01) |

(52) U.S. Cl.
USPC ................................ 83/58; 83/477.2; 83/564

(58) Field of Classification Search
USPC ......... 83/58, 477.2, 62.1, 471, DIG. 1, 471.2, 83/581, 478, 490, 663, 781, 564; 144/384, 144/391, 427, 154.5, 356; 324/688, 661; 318/16, 480; 340/686.5, 686.6, 532
See application file for complete search history.

(56) References Cited

U.S. PATENT DOCUMENTS

| | | | | |
|---|---|---|---|---|
| 2,505,958 | A | | 5/1950 | Grierson |
| 2,652,863 | A | | 9/1953 | Grabinski |
| 2,719,547 | A | | 10/1955 | Gjerde |
| 2,844,173 | A | | 7/1958 | Gaskell |
| 2,898,893 | A | | 8/1959 | Rohrer et al. |
| 2,903,848 | A | | 9/1959 | Mayhew et al. |
| 2,937,672 | A | | 5/1960 | Gjerde |
| 3,013,592 | A | | 12/1961 | Ambrosio et al. |
| 3,036,608 | A | | 5/1962 | Weber |
| 3,320,740 | A | | 5/1967 | Hamkins |
| 3,344,819 | A | | 10/1967 | Mitchell |
| 3,715,697 | A | * | 2/1973 | Them ............................ 337/157 |
| 3,954,051 | A | | 5/1976 | Steiniger |

(Continued)

FOREIGN PATENT DOCUMENTS

| | | | |
|---|---|---|---|
| DE | 20007037 | U1 | 7/2000 |
| DE | 202004012468 | U1 | 11/2004 |

OTHER PUBLICATIONS

Photograph of Mafell Erika 70Ec Pull-Push saw, downloaded Oct. 29, 2009 from http://www.maschinensucher.de/ma2/bilderanzeigen-A600704-1-english.html.

*Primary Examiner* — Ghassem Alie
(74) *Attorney, Agent, or Firm* — Maginot, Moore & Beck

(57) ABSTRACT

A power tool in one embodiment includes a work-piece support surface, a swing arm assembly movable along a swing path between a first swing arm position whereat a portion of a shaping device supported by the swing arm assembly extends above the work-piece support surface and a second swing arm position whereat the portion of the shaping device does not extend above the work-piece support surface, a mechanical fuse positioned to maintain the swing arm assembly in the first swing arm position, an actuator configured to apply a force to the mechanical fuse sufficient to break the mechanical fuse and to force the swing arm assembly away from the first swing arm position and toward the second swing arm position, and a control system configured to actuate the actuator in response to a sensed condition.

15 Claims, 11 Drawing Sheets

(56) References Cited

U.S. PATENT DOCUMENTS

| | | | |
|---|---|---|---|
| 4,161,272 | A | 7/1979 | Brockl |
| 4,184,394 | A | 1/1980 | Gjerde |
| 4,336,733 | A | 6/1982 | Macksoud |
| 4,616,447 | A | 10/1986 | Haas et al. |
| 4,962,685 | A | 10/1990 | Hagstrom |
| 5,676,319 | A | 10/1997 | Stiggins et al. |
| 5,819,625 | A | 10/1998 | Sberveglieri |
| 6,036,608 | A | 3/2000 | Morris |
| 6,530,303 | B1 | 3/2003 | Parks et al. |
| 6,536,536 | B1 | 3/2003 | Gass et al. |
| 6,813,983 | B2 | 11/2004 | Gass et al. |
| 6,826,988 | B2 | 12/2004 | Gass et al. |
| 6,834,730 | B2 | 12/2004 | Gass et al. |
| 6,857,345 | B2 | 2/2005 | Gass et al. |
| 6,877,410 | B2 | 4/2005 | Gass et al. |
| 6,880,440 | B2 | 4/2005 | Gass et al. |
| 6,920,814 | B2 | 7/2005 | Gass et al. |
| 6,922,153 | B2 | 7/2005 | Pierga et al. |
| 6,945,148 | B2 | 9/2005 | Gass et al. |
| 6,945,149 | B2 | 9/2005 | Gass et al. |
| 6,957,601 | B2 | 10/2005 | Gass et al. |
| 6,994,004 | B2 | 2/2006 | Gass et al. |
| 6,997,090 | B2 | 2/2006 | Gass et al. |
| 7,000,514 | B2 | 2/2006 | Gass et al. |
| 7,024,975 | B2 | 4/2006 | Gass et al. |
| 7,029,384 | B2 | 4/2006 | Steimel et al. |
| 7,055,417 | B1 | 6/2006 | Gass |
| 7,077,039 | B2 | 7/2006 | Gass et al. |
| 7,093,668 | B2 | 8/2006 | Gass et al. |
| 7,098,800 | B2 | 8/2006 | Gass |
| 7,100,483 | B2 | 9/2006 | Gass et al. |
| 7,121,358 | B2 | 10/2006 | Gass et al. |
| 7,137,326 | B2 | 11/2006 | Gass et al. |
| 7,171,879 | B2 | 2/2007 | Gass et al. |
| 7,197,969 | B2 | 4/2007 | Gass et al. |
| 7,210,383 | B2 | 5/2007 | Gass et al |
| 7,225,712 | B2 | 6/2007 | Gass et al. |
| 7,228,772 | B2 | 6/2007 | Gass |
| 7,231,856 | B2 | 6/2007 | Gass et al. |
| 7,284,467 | B2 | 10/2007 | Gass et al. |
| 7,290,472 | B2 | 11/2007 | Gass et al. |
| 7,290,967 | B2 | 11/2007 | Steimel et al. |
| 7,308,843 | B2 | 12/2007 | Gass et al. |
| 7,328,752 | B2 | 2/2008 | Gass et al. |
| 7,347,131 | B2 | 3/2008 | Gass |
| 7,350,444 | B2 | 4/2008 | Gass et al. |
| 7,350,445 | B2 | 4/2008 | Gass et al. |
| 7,353,737 | B2 | 4/2008 | Gass et al. |
| 7,357,056 | B2 | 4/2008 | Gass et al. |
| 7,359,174 | B2 | 4/2008 | Gass |
| 7,377,199 | B2 | 5/2008 | Gass et al. |
| 7,421,315 | B2 | 9/2008 | Gass et al. |
| 7,472,634 | B2 | 1/2009 | Gass et al. |
| 7,475,542 | B2 | 1/2009 | Borg et al. |
| 7,481,140 | B2 | 1/2009 | Gass et al. |
| 7,509,899 | B2 | 3/2009 | Gass et al. |
| 7,525,055 | B2 | 4/2009 | Gass et al. |
| 7,536,238 | B2 | 5/2009 | Gass |
| 7,540,334 | B2 | 6/2009 | Gass et al. |
| 7,591,210 | B2 | 9/2009 | Gass et al. |
| 7,600,455 | B2 | 10/2009 | Gass et al. |
| 7,628,101 | B1 | 12/2009 | Knapp et al. |
| 7,698,975 | B2 | 4/2010 | Peot et al. |
| 7,721,633 | B2 | 5/2010 | Gaw |
| 8,065,943 | B2 | 11/2011 | Gass et al. |
| 2002/0020265 | A1 | 2/2002 | Gass et al. |
| 2003/0089212 | A1 | 5/2003 | Parks et al. |
| 2004/0035595 | A1 | 2/2004 | Fisher |
| 2004/0159198 | A1 | 8/2004 | Peot et al. |
| 2005/0166736 | A1 | 8/2005 | Gass et al. |
| 2005/0268767 | A1 | 12/2005 | Pierga et al. |
| 2007/0074612 | A1 | 4/2007 | Yu |

* cited by examiner

TABLE SAW WITH MECHANICAL FUSE

This application is a divisional of application Ser. No. 12/548,201, filed on Aug. 26, 2009 (now U.S. Pat. No. 8,210,076), the disclosure of which is hereby totally incorporated by reference in its entirety Cross-reference is made to U.S. Utility patent application Ser. No. 12/547,818 entitled "Table Saw with Actuator Module" by Mehta et al., which was filed on Aug. 26, 2009; U.S. Utility patent application Ser. No. 12/547,859 entitled "Table Saw with Dust Shield" by Chung, which was filed on Aug. 26, 2009; U.S. Utility patent application Ser. No. 12/547,912 entitled "Table Saw with Positive Locking Mechanism" by Chung et al., which was filed on Aug. 26, 2009; U.S. Utility patent application Ser. No. 12/547,977 entitled "Table Saw with Belt Stop" by Chung, which was filed on Aug. 26, 2009; U.S. Utility patent application Ser. No. 12/548,035 entitled "Table Saw with Alignment Plate" by Chung et al., which was filed on Aug. 26, 2009; U.S. Utility patent application Ser. No. 12/548,156 entitled "Table Saw with Swing Arm Support" by Chung et al., which was filed on Aug. 26, 2009; U.S. Utility patent application Ser. No. 12/548,236 entitled "Table Saw with Pressure Operated Actuator" by Fischer et al., which was filed on Aug. 26, 2009; U.S. Utility patent application Ser. No. 12/548,263 entitled "Table Saw with Reset Mechanism" by Groth et al., which was filed on Aug. 26, 2009; U.S. Utility patent application Ser. No. 12/548,280 entitled "Table Saw with Linkage Drop System" by Holmes et al., which was filed on Aug. 26, 2009; U.S. Utility patent application Ser. No. 12/548,317 entitled "Table Saw with Ratchet Mechanism" by Chung et al., which was filed on Aug. 26, 2009; and U.S. Utility patent application Ser. No. 12/548,342 entitled "Table Saw with Actuator Reset Mechanism" by Chung, which was filed on Aug. 26, 2009, the entirety of each of which is incorporated herein by reference. The principles of the present invention may be combined with features disclosed in those patent applications.

FIELD

The present disclosure relates to power tools and more particularly to power tools with exposed shaping devices.

BACKGROUND

A number of power tools have been produced to facilitate forming a work piece into a desired shape. One such power tool is a table saw. A wide range of table saws are available for a variety of uses. Some table saws such as cabinet table saws are very heavy and relatively immobile. Other table saws, sometimes referred to as jobsite table saws, are relatively light. Jobsite table saws are thus portable so that a worker can position the table saw at a job site. Some accuracy is typically sacrificed in making a table saw sufficiently light to be mobile. The convenience of locating a table saw at a job site, however, makes job site table saws very desirable in applications such as general construction projects.

All table saws, including cabinet table saws and job site table saws, present a safety concern because the saw blade of the table saw is typically very sharp and moving at a high rate of speed. Accordingly, severe injury such as severed digits and deep lacerations can occur almost instantaneously. A number of different safety systems have been developed for table saws in response to the dangers inherent in an exposed blade moving at high speed. One such safety system is a blade guard. Blade guards movably enclose the saw blade, thereby providing a physical barrier that must be moved before the rotating blade is exposed. While blade guards are effective to prevent some injuries, the blade guards can be removed by a user either for convenience of using the table saw or because the blade guard is not compatible for use with a particular shaping device. By way of example, a blade guard is typically not compatible with a dado blade and must typically be removed when performing non-through cuts.

Table saw safety systems have also been developed which are intended to stop the blade when a user's hand approaches or touches the blade. Various stopping devices have been developed including braking devices which are physically inserted into the teeth of the blade. Such approaches are extremely effective. Upon actuation of this type of braking device, however, the blade is typically ruined because of the braking member. Additionally, the braking member is typically destroyed. Accordingly, each time the safety device is actuated; significant resources must be expended to replace the blade and the braking member. Another shortcoming of this type of safety device is that the shaping device must be toothed. Moreover, if a spare blade and braking member are not on hand, a user must travel to a store to obtain replacements. Thus, while effective, this type of safety system can be expensive and inconvenient.

Some safety systems incorporating blade braking systems also move the blade below the surface of the table saw once the blade has been stopped. In this type of system, a latch is typically used to maintain the blade in position above the table saw surface until the braking system is activated. Such latches are susceptible to becoming accidentally dislodged. Accidental dislodgement can result in undesired delay in shaping activities.

In view of the foregoing, it would be advantageous to provide a power tool with a safety system that does not interfere with shaping procedures. A safety system that did not damage the blade or other shaping device when the safety system is activated would be further advantageous. A further advantage would be realized by a safety system that incorporated inexpensive replacement parts.

SUMMARY

In accordance with one embodiment, a table saw includes a work-piece support surface, a swing arm assembly movable along a swing path between a first swing arm position whereat a portion of a shaping device supported by the swing arm assembly extends above the work-piece support surface and a second swing arm position whereat the portion of the shaping device does not extend above the work-piece support surface, a mechanical fuse positioned to maintain the swing arm assembly in the first swing arm position, an actuator configured to apply a force to the mechanical fuse sufficient to break the mechanical fuse and to force the swing arm assembly away from the first swing arm position and toward the second swing arm position, and a control system configured to actuate the actuator in response to a sensed condition.

In another embodiment, A table saw includes a work piece support surface, a shaping device support shaft automatically retractable along a retraction path from a first position to a second position in response to a sensed condition, wherein the second position is more distal to the work piece support surface than the first position, a mechanical fuse positioned to maintain the shaping device support shaft in the first position, and a control system configured to cause the shaping device support shaft to retract along the retraction path in response to a sensed condition by breaking the mechanical fuse.

In a further embodiment, a power tool includes a latch hold mechanism, a swing arm movable along a swing arm path between an upper first swing arm position and a lower second swing arm position, a mechanical fuse supporting the swing arm assembly in the first swing arm position, an actuating device configured to transfer a first force to the swing arm sufficient to break the mechanical fuse, and a control system configured to control the actuating device.

BRIEF DESCRIPTION OF THE DRAWINGS

The accompanying drawings illustrate various embodiments of the present disclosure and together with a description serve to explain the principles of the disclosure.

Corresponding reference characters indicate corresponding parts throughout the several views. Like reference characters indicate like parts throughout the several views.

DETAIL DESCRIPTION OF THE DISCLOSURE

Figure 1:
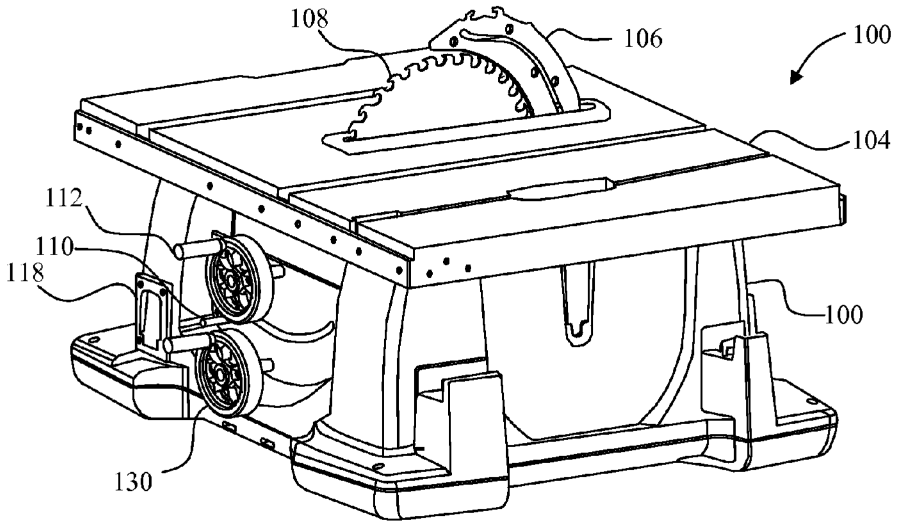
FIG. 1 depicts a top perspective view of a table saw incorporating a mitigation system in accordance with principles of the invention.

While the power tools described herein are susceptible to various modifications and alternative forms, specific embodiments thereof have been shown by way of example in the drawings and will herein be described in detail. It should be understood, however, that there is no intent to limit the power tools to the particular forms disclosed. On the contrary, the intention is to cover all combinations of features, modifications, equivalents, and alternatives falling within the spirit and scope of the invention as defined by the appended claims.

Referring to FIG. 1, a table saw 100 is shown. The table saw 100 includes a base housing 102 and a work-piece support surface 104. A splitter 106 is positioned adjacent to a blade 108 which extends from within the base housing 102 to above the work-piece support surface 104. A blade guard (not shown) may be attached to the splitter 106. An angle indicator 110 indicates the angle of the blade 108 with respect to the work-piece support surface 104. A bevel adjust turn-wheel 112 may be used to establish the angle of the blade 108 with respect to the work-piece support surface 104 by pivoting a frame 114 (shown in FIG. 2) within the base housing 102.

A motor 116 which is powered through a switch 118 located on the base housing 102, is supported by a carriage assembly 120. The carriage assembly 120 and a stop pad 122 are supported by the frame 114. The carriage assembly 120 includes a carriage 124 to which the motor 116 is mounted and two guiderails 126/128. The position of the carriage 124 along the guiderails 126/128 is controlled by a blade height turn-wheel 130 through a gearing assembly 132 and a height adjustment rod 134. The carriage 124 fixedly supports a latch assembly 140 and pivotably supports a swing arm assembly 142.

Figure 3:
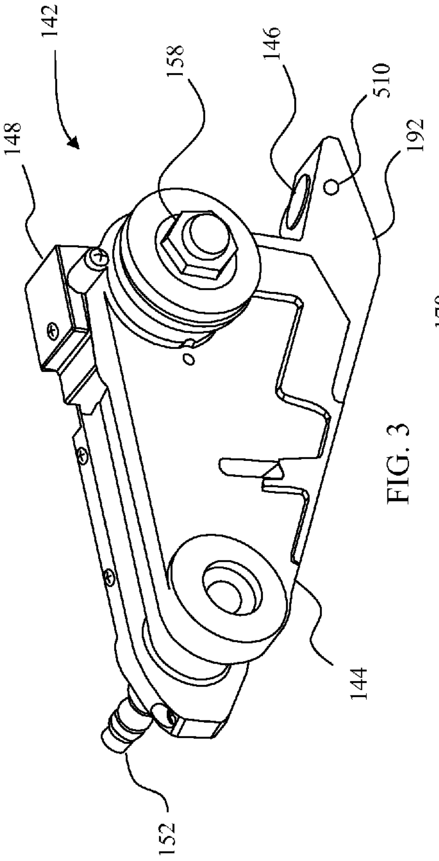
FIG. 3 depicts a perspective view of the swing arm assembly of the table saw of FIG. 1.
Figure 7:
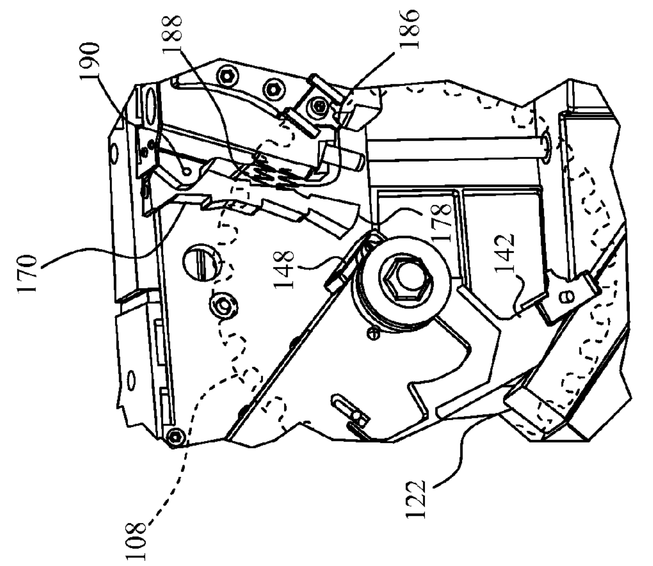
FIG. 7 depicts a partial perspective view of the swing arm assembly and latch assembly of FIG. 1 after the swing arm assembly has cleared the latch hold allowing the latch hold to be biased into the swing path.

The swing arm assembly 142 is pivotally coupled to the carriage 124 for movement between a fused position (see FIG. 4A) and a de-fused position (see FIG. 7). The swing arm assembly 142 includes a housing 144, which encloses a power wheel 150 that is driven by a power shaft 152. The power shaft 152 may be directly driven by the motor 116 or by a reduction gear. A belt 154 transfers rotational movement from the power wheel 150 to a blade wheel 156. A nut 158 is used to affix the blade 108 (not shown in FIGS. 3 and 4 for purpose of clarity) to the blade wheel 156. A tensioner 160 maintains the belt 154 at a desired tension. Additionally, as shown in FIG. 3, the swing arm assembly 142 may also include a strike plate 146 and a rebound plate 148 mounted on the housing 144.

Figure 4:
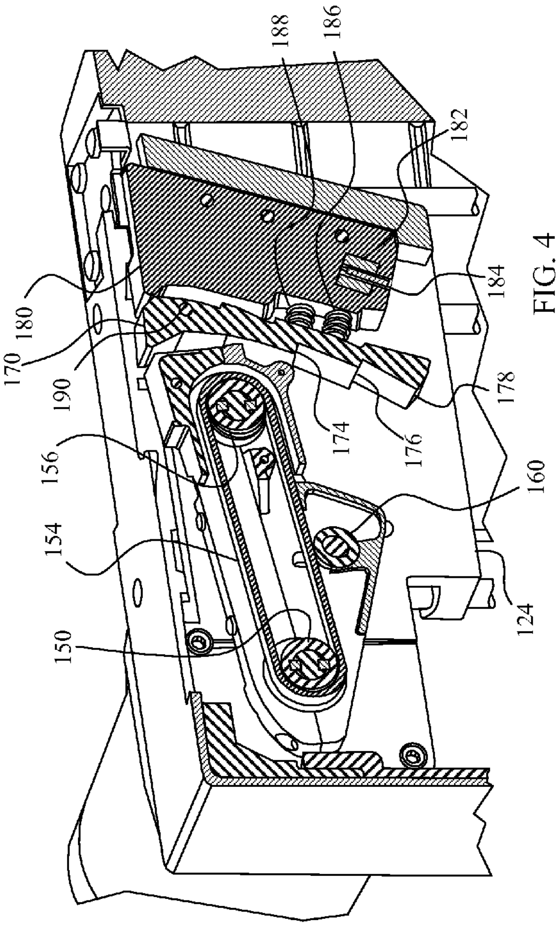
FIG. 4 depicts a partial perspective cross-sectional view of the swing arm assembly of FIG. 3.

A latch hold 170 which is part of the latch assembly 140 includes three rebound ledges 174, 176, and 178 (see FIG. 4). The latch assembly 140 further includes a base 180 and an actuator 182 with an actuator pin 184. Two springs 186 and 188 are positioned between the base 180 and the latch hold 170 which is mounted by a pivot 190 to the carriage 124.

Figure 5A:
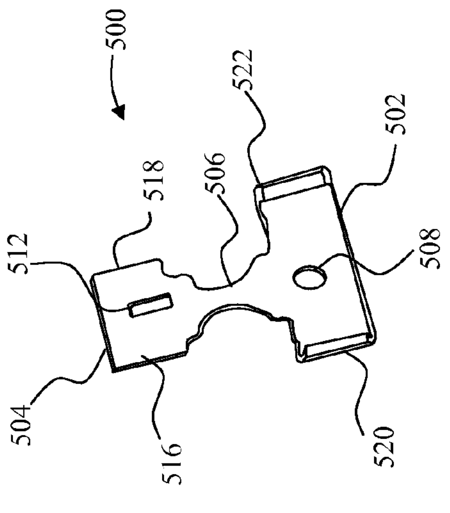
FIG. 5A depicts a perspective view of the mechanical fuse of FIG. 2.

A mechanical fuse 500, also shown in FIG. 5A, includes a base 502 coupled with the swing arm assembly 142 and a head 504 coupled to the base 180. The mechanical fuse includes a neck 506 which extends between the base 502 and the head 504. The mechanical fuse 500 may be monolithic. Alternatively, the base 502, neck 506, and head 504 may be formed from different compounds or materials, which are fused, coupled, or connected together. The mechanical fuse 500 is made from materials which are not affected by dust, lubrication, or corrosion. In alternative embodiments, a mechanical fuse may be provided in the form of a shear pin. In such embodiments, the shear pin is aligned with a shear plane that is substantially parallel to the plane in which the swing arm assembly 142 pivots.

The mechanical fuse 500 further includes features and elements for aligning the fuse 500 with the swing arm assembly 142 and the carriage 124. For instance, the mechanical fuse 500 includes a recess 508, which in this embodiment extends completely through the base 510 (FIG. 4D) for accepting a detent, such as a ball detent 510 (FIG. 3), located in the swing arm assembly 142. A slot 512 is provided on the head 504 of the mechanical fuse 500. The slot 512 is configured to accept a fastener 514 (see FIG. 6). Additionally, the fuse 500 includes contact portions 516 and 518 and gripping portions 520 and 522.

Figure 6:
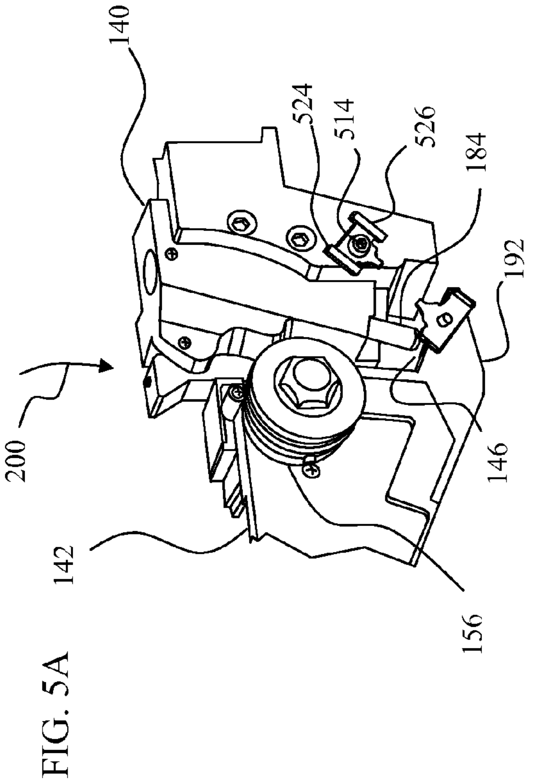
FIG. 6 depicts a partial perspective view of the swing arm assembly and latch assembly of FIG. 1 after the solenoid has been actuated thereby breaking the mechanical fuse along a break plane perpendicular to the solenoid axis.

The contact portions 516 and 518 are configured to contact guide portions 524 and 526, seen most clearly in FIG. 6. The mechanical fuse is mounted by grasping the gripping portions 520 and 522 and placing the head 504 between the guide portions 524 and 526. Contact between the contact portions 516 and 518 and gripping portions 520 and 522 aligns the slot 512 with a mounting feature (not shown) in the base 180 such that the fastener 514 can be inserted through the slot 512 and coupled to the base 180. The mechanical fuse is then pulled downwardly until the fastener 514 contacts the upper end of the slot 512 at which point the recess 508 is positioned to receive the detent 510. Accordingly, the mechanical fuse 500 and the swing arm assembly 142 are both precisely aligned with the base 180.

Figure 5B:
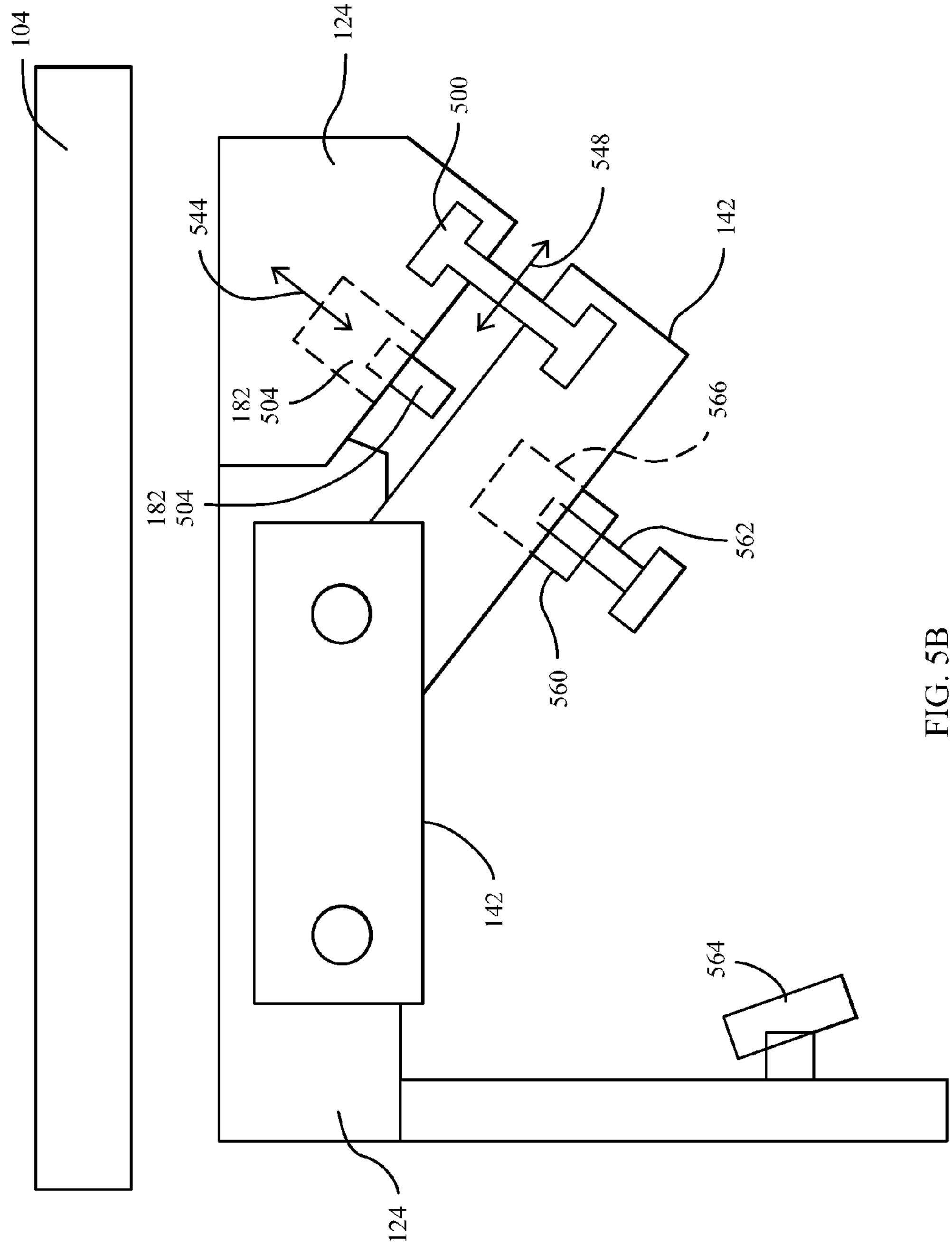
FIG. 5B depicts a side view the swing arm assembly of the table saw supported by a mechanical fuse and including a shock absorber.

The actuator 182 is configured to generate a force sufficient to break the mechanical fuse 500 and to force the swing arm assembly 142 into the de-fused position. As shown in FIG. 5B, the actuator 182 is positioned within the base 180; however, in some embodiments the actuator 182 may be coupled to the swing arm assembly 142 or the frame 114. The actuator 182 includes a pin 182, which is movable along a pin axis 544, as shown in FIG. 5B. The pin axis 544 is approximately perpendicular to a break plane 548 of the mechanical fuse 500. In response to being activated by a controller (not illustrated) the actuator 182 is configured move the pin 184 along the pin axis 544 to break the mechanical fuse 500 along the break plane 548. Depending on the embodiment, the mechanical fuse 500 may be positioned adjacent to the actuator 504.

Operation of the table saw 100 is described with reference to FIGS. 1-5. Initially, the mechanical fuse 500 maintains the swing arm assembly 142 of the table saw 100 in a fused position by coupling the swing arm assembly 142 to the latch hold base 180. The mechanical fuse 500 is configured to maintain the position of the swing arm assembly 142 under normal operational loads of the table saw 100.

In this position, the springs 188 and 186 are under compression and exert a bias on the latch hold 170 about the pivot 190 in a clockwise direction as viewed in FIG. 4. Additionally, the blade wheel 156 is positioned sufficiently close to the work-piece support surface 104 that the blade 108 extends above the work-piece support surface 104 as shown in FIG. 1. A user operates the bevel adjust turn wheel 112 to pivot the frame 114 with respect to the work-piece support surface 104 to establish a desired angle between the blade 108 and the work-piece support surface 104. The user further operates the blade height adjustment turn-wheel 130 to move the carriage 124 along the guiderails 126/128 to establish a desired height of the blade 108 above the work-piece support surface 104.

Using the switch 118, power is then applied to the motor 116 causing the output shaft 152 and the power wheel 150 to rotate. Rotation of the power wheel 150 causes the belt 154 to rotate the blade wheel 156 and the blade 108 which is mounted on the blade wheel 156. A work-piece may then be shaped by moving the work-piece into contact with the blade 108.

The table saw 100 includes a sensing and control circuit (not shown) which activates the actuator 182 in response to a sensed condition. Any desired sensing and control circuit may be used for this purpose. One acceptable sensing and control circuit is described in U.S. Pat. No. 6,922,153, the entire contents of which are herein incorporated by reference. The safety detection and protection system described in the '153 patent senses an unsafe condition and provides a control signal which, in the table saw 100, is used to actuate the actuator 182.

Figure 2:
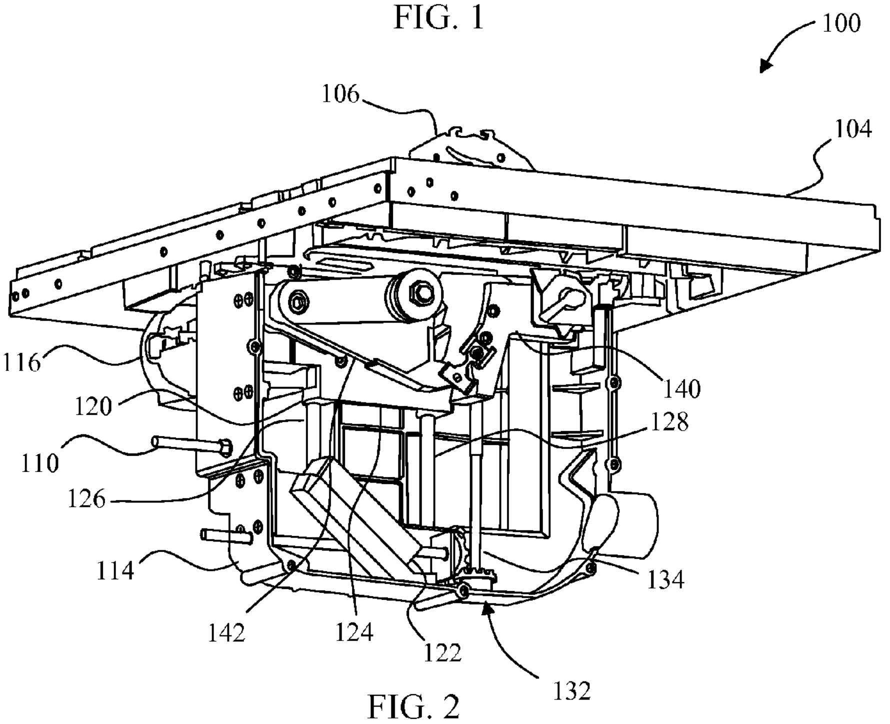
FIG. 2 depicts a bottom perspective view of the table saw of FIG. 1 with the housing removed showing a movable carriage mounted on a pivoting frame beneath the work-piece support surface.

When activated, the actuator 182 drives the actuator pin 184 outwardly from the actuator 182. When the swing arm assembly 142 is maintained in a fused position as shown in FIG. 2, the strike plate 146 is aligned with the actuator 182. Accordingly, as the actuator pin 184 is forced out of the actuator 182, the actuator pin 184 contacts the swing arm assembly 142 and pivots the swing arm assembly 142 in a direction, which applies a force upon the mechanical fuse 500. The mechanical fuse 500 is configured to separate at a predetermined location under a predetermined amount of force along the break plane 548. As shown in FIG. 5B the mechanical fuse 500 is configured to separate at the neck 516, which is the portion of the mechanical fuse 500 at which stress is concentrated. Thus, once the applied force exceeds a tensile strength of the fuse 500, the fuse 500 separates into at least two pieces.

Once the fuse 500 is separated the swing arm assembly 142 is no longer maintained in the fused position. Consequently, the swing arm assembly 142 pivots about the power shaft 152 in the direction of the arrow 200 of FIG. 6 such that the blade wheel 156 moves away from the work-piece support surface 104 through the position shown in FIG. 6 to the position shown in FIG. 7. Accordingly, the blade 108 is pulled by the swing arm assembly 142 in a direction away from the work-piece support surface 104.

Figure 5C:
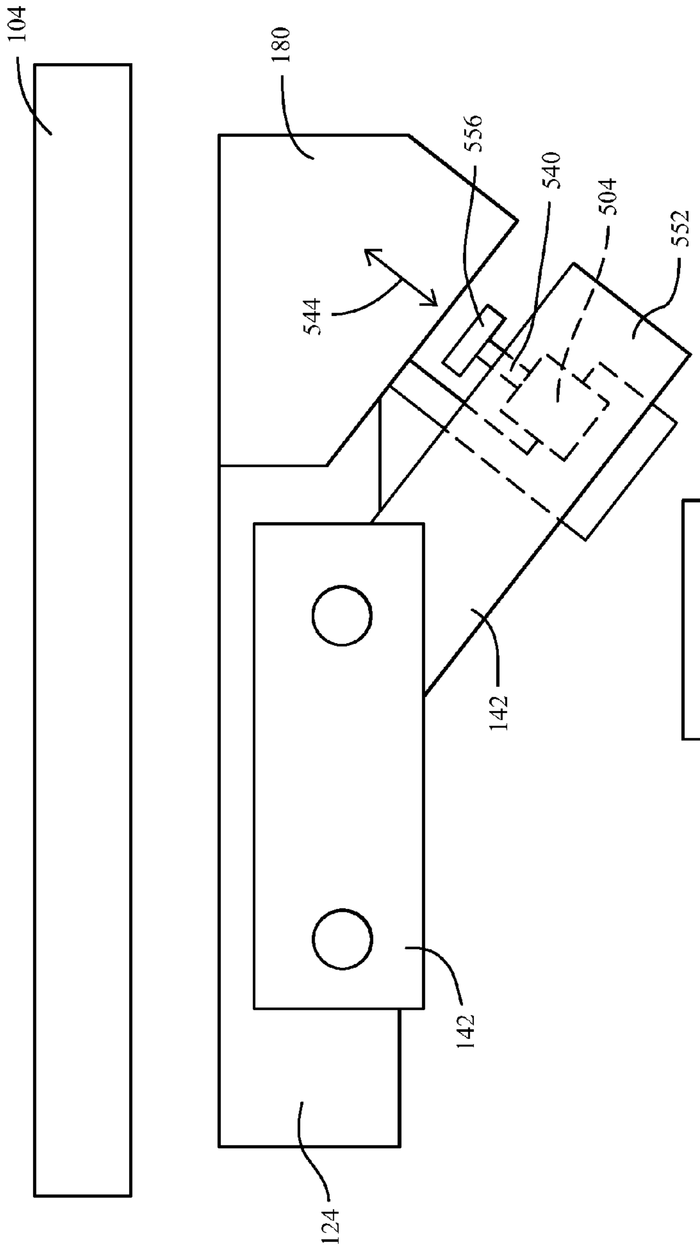
FIG. 5C depicts a side view of the swing arm assembly of the table saw including a pull-type of actuator.
Figure 5D:
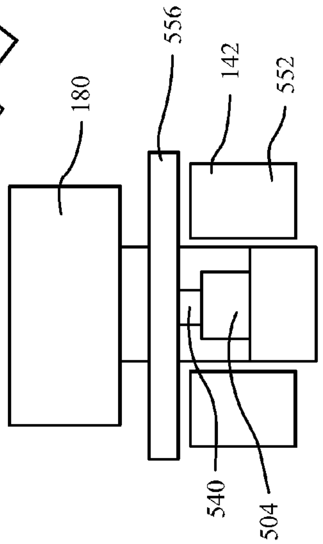
FIG. 5D depicts a front view of the swing arm assembly of FIG. 5C.

As shown in FIGS. 5C and 5D, the actuator 504 may be configured to pivot the swing arm assembly 142 with a "pulling" force instead of a "pushing" force. In this embodiment, an actuator 504 is mounted between a forked section 552 of the swing arm assembly 142. When the actuator 504 is activated, an arm 556 moves downwardly to pull the swing arm assembly 142 to the de-fused position.

As the swing arm assembly 142 moves in the direction of the arrow 200, the rebound plate 148 of the swing arm assembly 142 rotates below the rebound ledge 178 of the latch hold 170. At this point, rotation of the latch hold 170 about the pivot 190 is no longer restrained by the swing arm assembly 142. Accordingly, the springs 186 and 188 cause the latch hold 170 to rotate into a position whereat the rebound ledge 178 is located in the swing path of the swing arm 142, that is, the path along which the swing arm 142 moves, as shown in FIG. 7.

The configuration of FIG. 7 further shows the swing arm assembly 142 rotated to a position whereat the swing arm assembly 142 contacts the stop pad 122. Accordingly, further rotation of the swing arm assembly 142 in the direction of the arrow 200 of FIG. 6 is impeded by the stop pad 122. At this position, the blade 108 is completely located below the work-piece support surface 104. Therefore, an operator above the work-piece support surface 104 cannot be injured by the blade 108.

In one embodiment, the stop pad 122 is made with microcellular polyurethane elastomer (MPE). MPEs form a material with numerous randomly oriented air chambers. Some of the air chambers are closed and some are linked. Additionally, the linked air chambers have varying degrees of communication between the chambers and the orientation of the linked chambers varies. Accordingly, when the MPE structure is compressed, air in the chambers is compressed. As the air is compressed, some of the air remains within various chambers, some of the air migrates between other chambers and some of the air is expelled from the structure. One such MPE is MH 24-65, commercially available from Elastogran GmbH under the trade name CELLASTO®. In other embodiments, a foam material such as "memory foam" may be used.

Use of an MPE or other appropriate material in the stop pad 122 stops rotation of the swing arm assembly 142 without damaging the swing arm assembly 142. Prior to impacting the stop pad 122, however, the swing arm assembly 142 may be moving with sufficient force to cause the swing arm assembly to rebound off of the stop pad 122. In such a circumstance, the swing arm assembly 142 will rotate about the power shaft 152 in a counterclockwise direction. Thus, the blade 108 moves toward the work-piece support surface 104. Movement of the blade 108 above the work-piece support surface 104, however, is inhibited by the latch hold 170.

Figure 8:
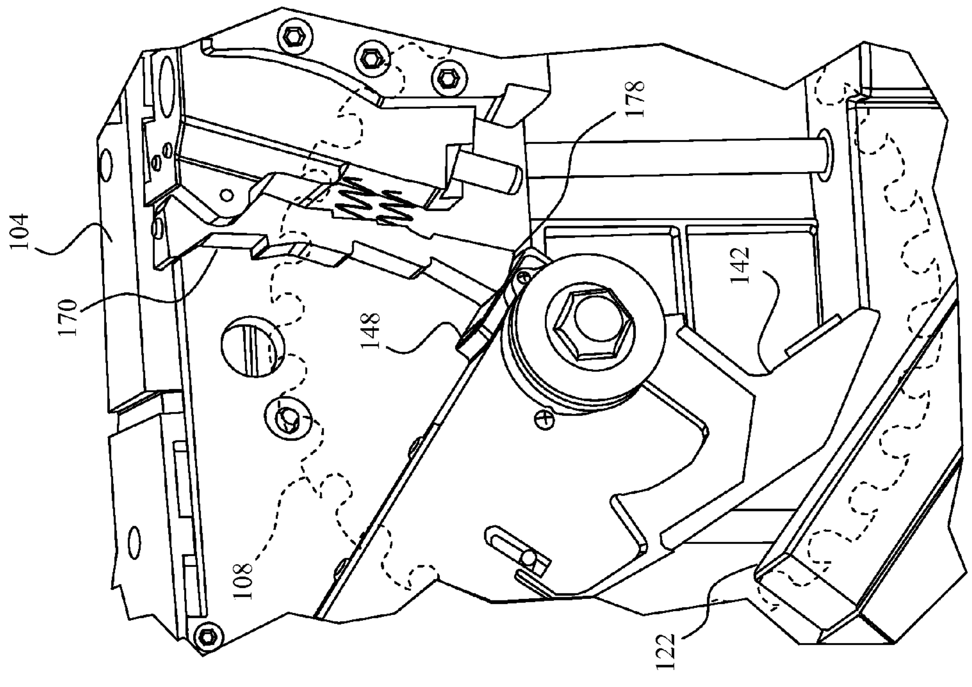
FIG. 8 depicts a partial perspective view of the swing arm assembly and latch assembly of FIG. 1 after the swing arm assembly has rebounded off of the stop pad and has been captured by a latch hold ledge thereby keeping the shaping device below the surface of the work-piece support surface.

Specifically, because the springs 186 and 188 bias the latch hold 170 to a location within the swing path of the swing arm assembly 142, movement of the swing arm assembly 142 toward the work-piece support surface 104 brings the rebound plate 148 into contact with the rebound ledge 178 as shown in FIG. 8. In the position of FIG. 8, the blade 108 remains below the surface of the work-piece support surface 104 even after the swing arm assembly 142 rebounds off of the stop pad 122. Therefore, an operator above the work-piece support surface 104 cannot be injured by the blade 108.

The spring constants for the springs 186 and 188 are thus selected to ensure that the latch hold 170 is positioned within the swing path of the swing arm assembly 142 before the swing arm assembly 142 travels from the latched position downwardly into contact with the stop pad 122 and then upwardly to a position whereat the blade 108 is above the work-piece support surface 104. Of course, the time available for moving the latch hold 170 into the swing path can be increased by moving the stop pad 122 further away from the work-piece support surface 104 along the swing path. Such modification increases the overall height of the frame 114, particularly for embodiments with variable blade height. The increased material for the frame 114 results in increased weight. Increased size and weight are generally not desired for movable power tools. Thus, positioning the stop pad 122 closer to the work-piece support surface 104 along the swing path reduces the height of the frame 114 and the resultant weight of the table saw 100.

Figure 9:
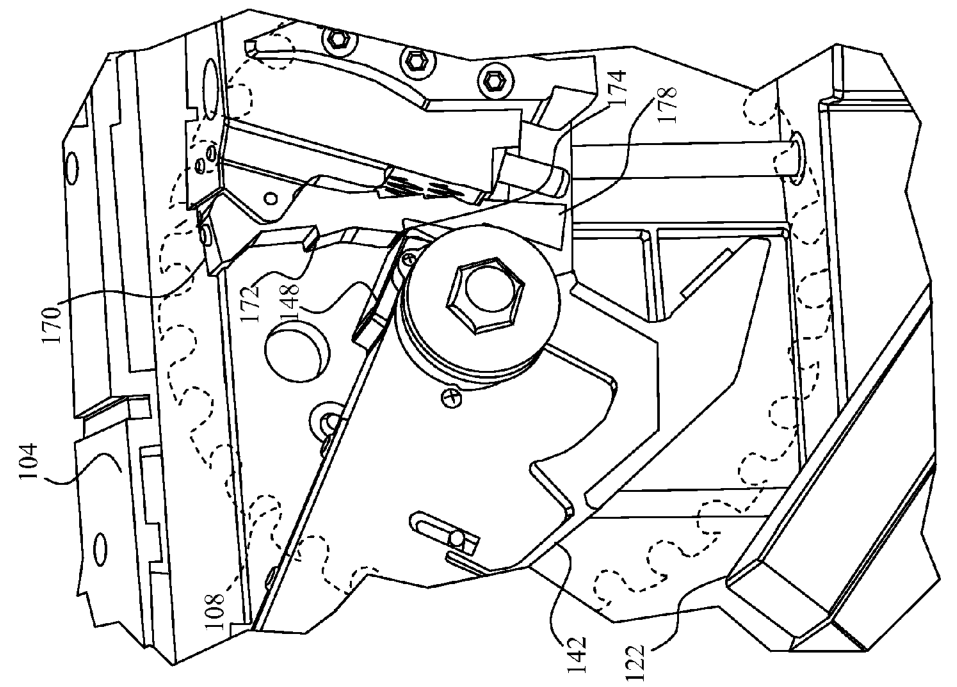
FIG. 9 depicts a partial perspective view of the swing arm assembly and latch assembly of FIG. 1 after the swing arm assembly has rebounded off of the stop pad and has been captured by a secondary latch hold ledge thereby keeping the shaping device below the surface of the work-piece support surface.

For some embodiments wherein the stop pad 122 is positioned closer to the work-piece support surface 104 along the swing path, such as the embodiment of FIG. 1, the distance between the swing arm assembly 142 in the latched position and the stop pad 122 is such that the swing arm assembly 142 contacts the stop pad 122 before the rebound plate 148 rotates beneath the rebound ledge 178. Accordingly, the rebound ledges 174 and 176 are provided at locations above the rebound ledge 178 to contact the rebound plate 148 when the swing arm assembly 142 is actuated with the carriage 124 positioned closer to the stop pad 122 as depicted in FIG. 9. In other embodiments, rebound ledges 174 and 176 may be provided as safety measures in the event the latch hold 170 does not move with the designed speed.

The angle and length of the stop pad 122 are selected in the embodiment of FIG. 2 to o ensure that the swing arm assembly 142 contacts the stop pad 122 at the foot 192 (see FIG. 3) regardless of the initial height of the carriage 124. Thus the foot 192 receives the force of the impact when the swing arm assembly 142 contacts the stop pad 122. Accordingly, while the materials used to form the foot 192, the strike plate 146, and the rebound plate 148 are selected to absorb multiple impacts, lighter materials may be used in other areas of the swing arm assembly 142 to minimize weight of the table saw 100.

As illustrated in FIG. 5B, the table saw 100 may include a damper, dashpot, or shock absorber 560 to dissipate the energy of the swing arm assembly 142 as it pivots to the de-fused position. Upon reaching the de-fused position, the shock absorber 560 contacts a striker plate 564 to dissipate the kinetic energy of the swing arm assembly 142. The shock absorber 560 prevents the swing arm assembly 142 from rebounding to the latched position. The shock absorber 560 may be a hydraulic shock absorber having a piston 562, which is moved into a body 566 of the shock absorber 560 upon contacting the striker plate 564. A fluid in the body 566 is heated, compressed, or expelled to dissipate the kinetic energy. As shown in FIG. 5B, the striker plate 564 is coupled to the carriage 124; however, the striker plate 564 may also be coupled to the frame 114.

Figure 10:
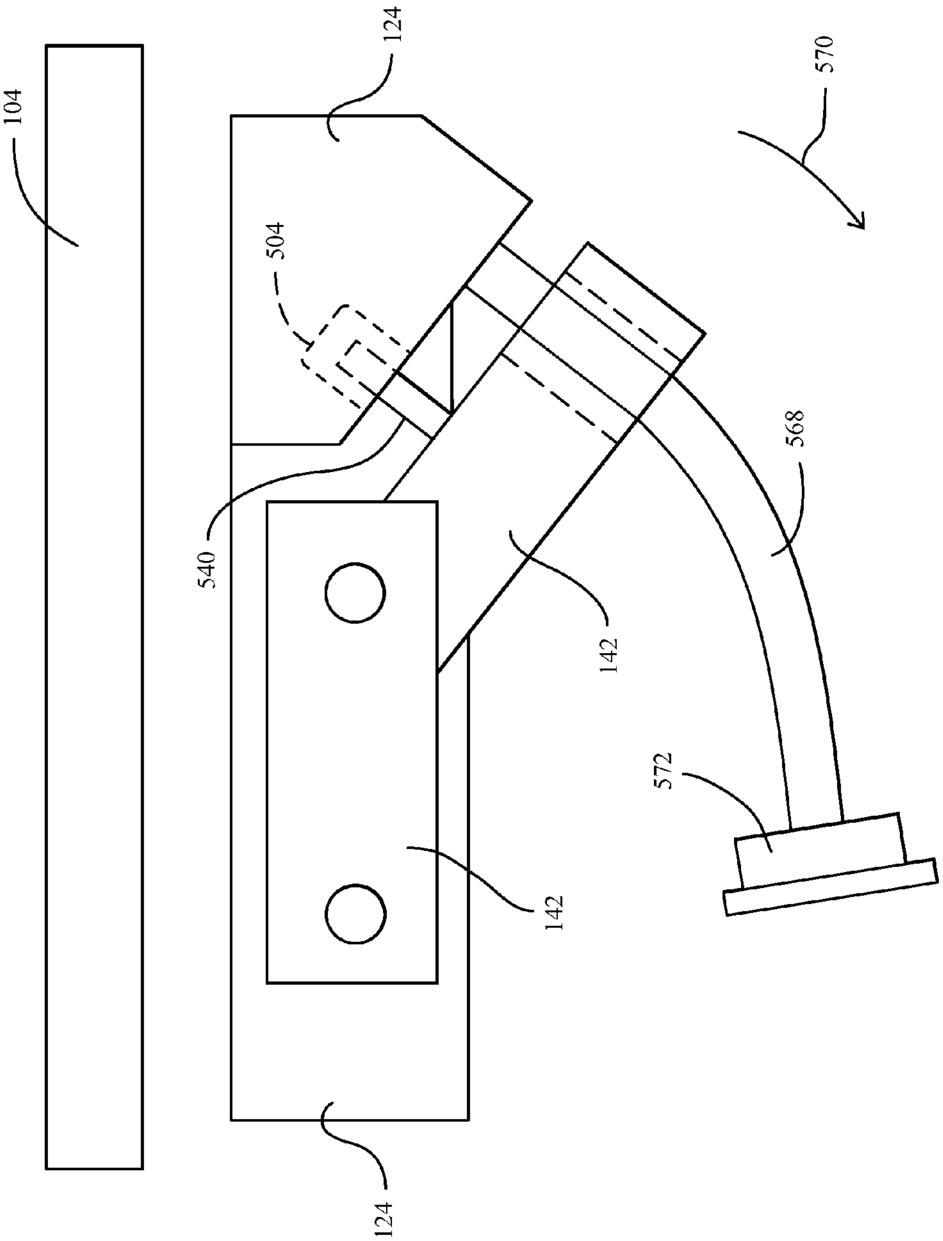
FIG. 10 depicts a side view of the swing arm assembly of the table saw including a support rod and a cushion.

As illustrated in FIG. 10, the table saw 100 may include a support rod 568 and a cushion 572 to dissipate the energy of the swing arm assembly 142 as it pivots to the de-latched position. The support rod 568 has a curvature, which matches approximately the path taken by the swing arm assembly 142 as it pivots to the de-fused position (see direction 570 of FIG. 10). The cushion 572 is coupled to the end of the support rod 568, and is configured to dissipate the kinetic energy of the swing arm assembly 142. Because the support rod 568 is coupled to the carriage 124 the position of the cushion 572, remains fixed relative the position of the blade 108.

Figure 11:
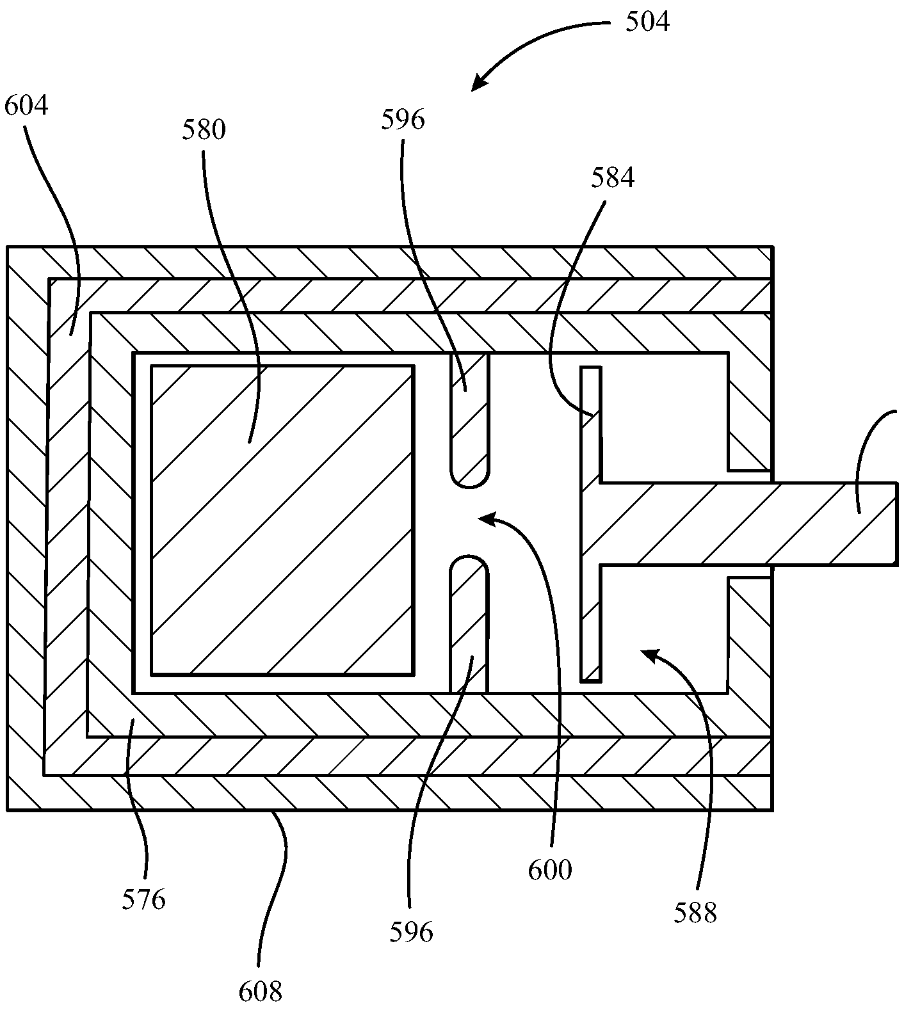
FIG. 11 depicts a cross sectional view of the actuator of the table saw.
Figure 12:
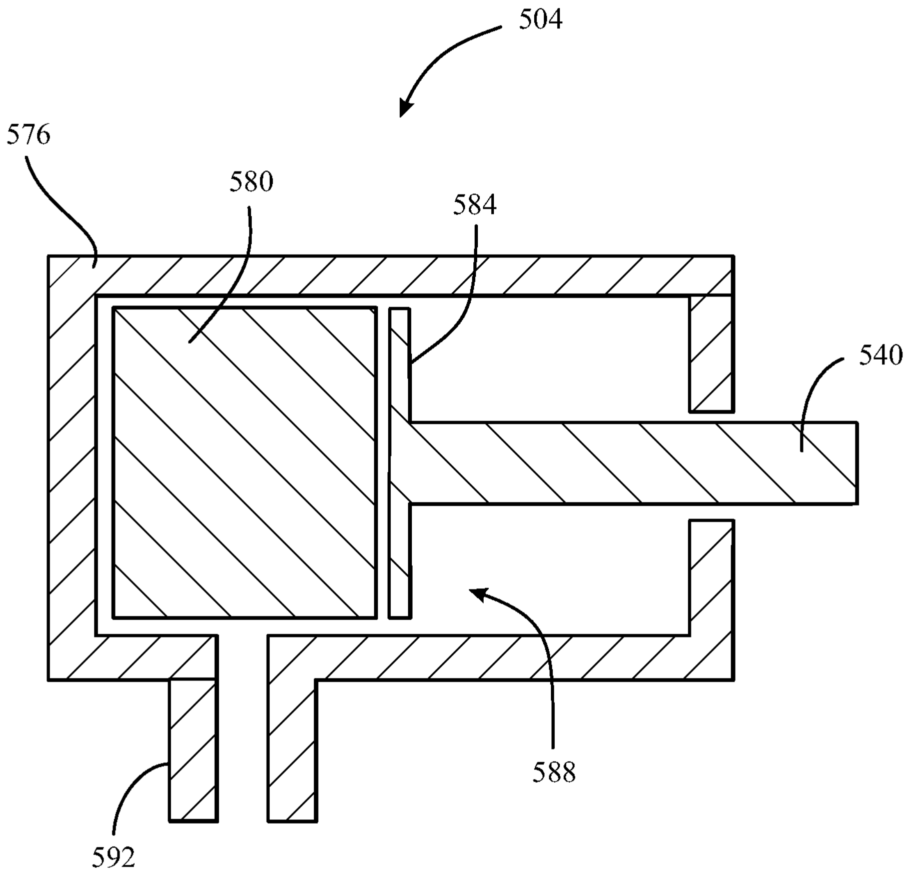
FIG. 12 depicts a cross sectional view of the actuator of the table saw.

Referring now to FIGS. 11 and 12, the actuator 504 is configured to reduce the shock imparted upon the table saw 100 during activation of the actuator 504. For instance, the actuator 504 in one embodiment is a pyrotechnic actuator, which includes a housing 576, a charge 580, and piston 584 connected to the pin 540. Ignition of the charge 580 generates a large pressure within a chamber 588 in the housing 576. The pressure is imparted upon the piston 584 and results in the pin 540 moving at a very high rate of acceleration. Accordingly, the pressure results in a very high peak transient load in the structure of the table saw 100. To accommodate the peak transient load, the table saw 100 includes a robust frame 114 and portions of the swing arm assembly 142 are hardened. By reducing the transient loads, however, the robustness of the frame 114 and the strength of the materials in the swing arm 142 may be reduced without impacting the dynamic performance of the actuator 504 or slowing movement of the blade 108 to a position below the surface of the work-piece support surface 104.

As illustrated in FIG. 11, one approach to reducing the transient load generated by the actuator 504 is to include a relief valve 592 fluidly coupled to the chamber 588. The relief valve 592 reduces the peak amount of pressure imparted upon the piston 584 in response to the ignition of the charge 580.

Another approach to reducing the peak transient load is illustrated in FIG. 11. As shown in FIG. 11, a divider 596 having an orifice 600 may be included in the chamber 588 to reduce the peak pressure imparted upon the piston 584 following ignition of the charge 580. Additionally, the housing 576 is surrounded by a shock absorbing mounting 604 and a casing 608 to reduce further the peak transient load. The housing 576 is configured for movement relative the casing 608.

Figure 13:
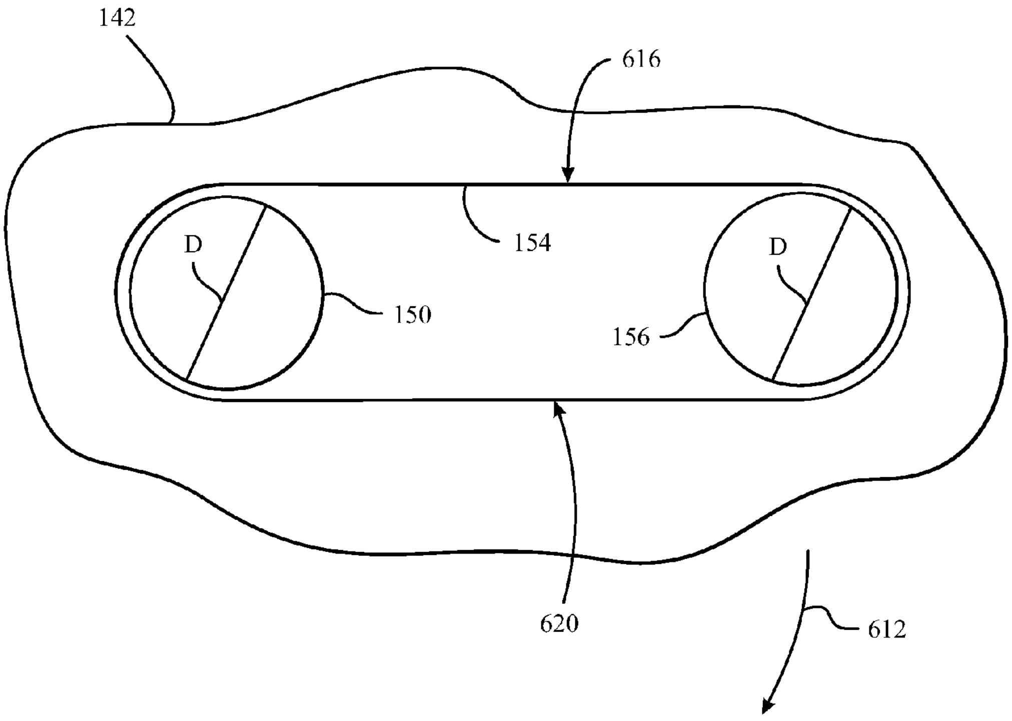
FIG. 13 depicts a partial cross sectional view of the swing arm assembly of the table saw.

The swing arm assembly 142 of FIG. 13, is configured to reduce the shock imparted upon the belt 154 in response to the sudden pivotal motion of the swing arm assembly 142 following activation of the actuator 504. In particular, when the actuator 504 pivots the swing arm assembly 142 in response to a sensed condition, the swing arm assembly 142 moves through a substantial angular range in a fraction of a second, as represented by direction 612 of FIG. 13. The rotation of the swing arm assembly 142 causes the belt 152 to become tighter on an upper side 616 and looser on a lower side 620. If power wheel 150 and the blade wheel 156 have different diameters D the force exerted upon the upper side 616 is not equal to the force exerted on the lower side 620 and the belt 154 may be damaged. If, however, as illustrated in FIG. 13, the power wheel 150 and the blade wheel 156 have the same diameter D, then the force on the upper side 616 of the belt 154 is equal to the force on the lower side 620 of the belt 154, thereby cancelling the damaging effects. In some embodiments the diameter of the power wheel 150 may be within 15% of the diameter of blade wheel 156 without damaging the belt 152.

Once the sensed condition has been cleared, the swing arm assembly 142 is reset by moving the latch hold 170 out of the swing path. This is effected by compressing the springs 188 and 186. The swing arm assembly 142 may then be rotated in a counterclockwise direction about the output shaft 152 until the rebound plate 148 is adjacent to the upper surface of the latch hold 170. The latch hold 170 is then released and the springs 188 and 186 bias the latch hold 170 about the pivot 190 into contact with the lip 164 of the swing arm assembly 142 which restricts rotation of the latch hold 170. Additionally, a new mechanical fuse 500 is positioned in the manner described above.

Figure 14:
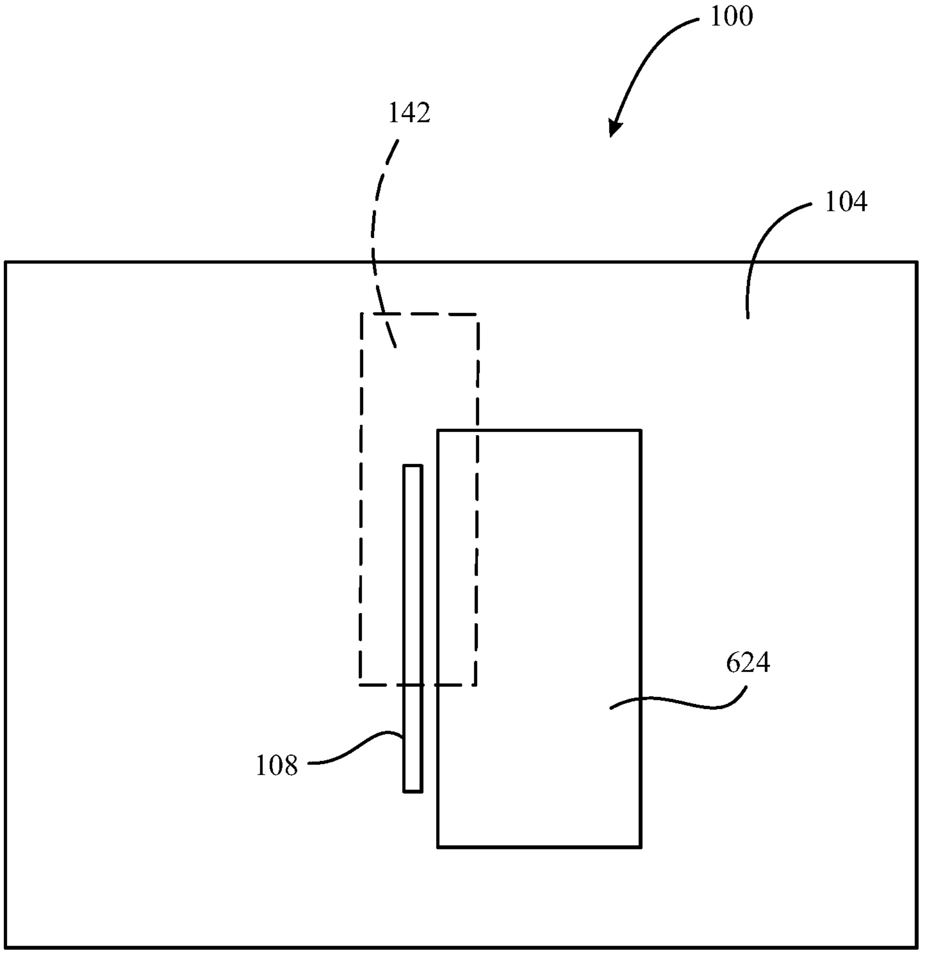
FIG. 14 depicts a top plan view of the table saw of FIG. 1.

As shown in FIG. 14 the table saw 100 may include an access door 624 for resetting the swing arm assembly 142. The access door 624 is formed in the work-piece support surface 104. When removed from the work-piece support surface 104, the access door 624 reveals an opening in the work-piece support surface 104 through which the swing arm assembly 142 is accessed. In one embodiment, the access door 624 has a dimension at least fifty percent or more of the diameter of the saw blade 108.

The table saw 100 thus actively monitors for an unsafe condition and initiates mitigation action automatically in the event an unsafe condition is sensed. Additionally, movement and subsequent stopping of the swing arm assembly 172 is accomplished without requiring physical contact with the blade 108. Accordingly, the blade 108 is not damaged by the mitigation action.

Moreover, because the mitigation action does not require interaction with the blade 108, the mitigation system of the table saw 100 may be used with other shaping devices such as sanding wheels, blades with varying dado blades, and molding head cutters, without requiring any modification to the mitigation system. Additionally, because the moving components of the mitigation system can be mounted on the frame 114, the mitigation system can be used with any desired blade height or bevel angle.

The mitigation system discussed with respect to the table saw 100 can be implemented using very light materials, and is thus amenable to incorporation into a variety of power tools including bench top saws and portable saws. For example, the components which are subjected to increased stress within the mitigation system, such as the solenoid pin 184, the latch hold 170, the rebound plate 148, and the strike plate 146, can be made of more durable materials including metals to withstand the impacts and stresses of activating the mitigation system. Other components, including the housings, may be fabricated from more lightweight materials to minimize the weight of the power tool.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A power tool, comprising:

a movable latch hold mechanism;

a swing arm movable along a swing arm path between an upper first swing arm position whereat the latch hold mechanism is constrained by the swing arm and a lower second swing arm position whereat the latch hold mechanism is not constrained by the swing arm;

a mechanical fuse supporting the swing arm in the first swing arm position;

an actuating device configured to transfer a first force to the swing arm sufficient to break the mechanical fuse; and a control system configured to control the actuating device.

2. The power tool of claim 1, wherein:

the actuating device comprises a pin member movable along a first axis; and the mechanical fuse defines a break plane generally perpendicular to the first axis.

3. The power tool of claim 2, wherein the mechanical fuse comprises:

a first connection portion removably attached to the latch hold mechanism;

a second connection portion supporting the swing arm assembly; and a neck portion located between the first connection portion and the second connection portion.

4. The power tool of claim 3, wherein the mechanical fuse further comprises:

at least one alignment member configured to align the first connection portion with the latch hold mechanism.

5. The power tool of claim 3, wherein:

the swing arm assembly comprises a ball detent pin; and the second connection portion comprises a recess configured to receive at least a portion of the ball detent pin therein.

6. The power tool of claim 3, wherein the second connection portion comprises a base portion extending in a first plane and a pair of opposing flanges extending out of the first plane.

7. The power tool of claim 1, wherein the mechanical fuse is positioned adjacent to the actuating device.

8. The power tool of claim 1, wherein the mechanical fuse comprises a shear pin.

9. A power tool, comprising:

a latch hold mechanism;

a swing arm movable along a swing arm path between an upper first swing arm position and a lower second swing arm position;

a mechanical fuse including (i) a first connection portion removably attached to the latch hold mechanism, (ii) a second connection portion supporting the swing arm assembly, and (iii) a neck portion located between the first connection portion and the second connection portion;

an actuating device configured to transfer a first force to the swing arm sufficient to break the mechanical fuse; and a control system configured to control the actuating device.

10. The power tool of claim 9, wherein:

the actuating device comprises a pin member movable along a first axis; and the mechanical fuse defines a break plane generally perpendicular to the first axis.

11. The power tool of claim 10, wherein the mechanical fuse further comprises:

at least one alignment member configured to align the first connection portion with the latch hold mechanism.

12. The power tool of claim 10, wherein:

the swing arm assembly comprises a ball detent pin; and the second connection portion comprises a recess configured to receive at least a portion of the ball detent pin therein.

13. The power tool of claim 10, wherein the second connection portion comprises a base portion extending in a first plane and a pair of opposing flanges extending out of the first plane.

14. The power tool of claim 9, wherein the mechanical fuse is positioned adjacent to the actuating device.

15. The power tool of claim 9, wherein the mechanical fuse comprises a shear pin.

* * * * *